United States Patent [19]

Grasso et al.

[11] Patent Number: 5,278,686

[45] Date of Patent: Jan. 11, 1994

[54] OPTICAL-FIBRE TELECOMMUNICATIONS LINE WITH PROTECTION DEVICE FOR OPTICAL AMPLIFIERS

[75] Inventors: Giorgio Grasso, Monza; Aldo Righetti, Milan; Mario Tamburello, Vimercate, all of Italy

[73] Assignee: Pirelli Cavi S.p.A., Milan, Italy

[21] Appl. No.: 846,276

[22] Filed: Mar. 2, 1992

[30] Foreign Application Priority Data

Mar. 29, 1991 [IT] Italy .................. MI91 A 000864

[51] Int. Cl.⁵ ............................ H04B 10/08; H01S 3/00
[52] U.S. Cl. ..................................... 359/110; 359/173; 359/152; 359/179; 359/341; 372/6
[58] Field of Search ............. 359/110, 174, 176–; 372/6; 250/227.15; 356/73.1

[56] References Cited

U.S. PATENT DOCUMENTS 4,247,956  1/1981  Christiansen et al. ............ 359/110

FOREIGN PATENT DOCUMENTS

| | | | |
|---|---|---|---|
| 0331304 | 12/1989 | European Pat. Off. ....... H04B 9/00 |
| 0415438 | 3/1991 | European Pat. Off. ............ 359/174 |
| 3201763 | 9/1983 | Fed. Rep. of Germany ...... 359/110 |
| 0229433 | 11/1985 | Japan ................................... 359/110 |
| 2051355 | 1/1981 | United Kingdom .......... H04B 9/00 |
| 9116773 | 10/1991 | World Int. Prop. O. .......... 359/110 |

*Primary Examiner*—Richard E. Chilcot, Jr.
*Assistant Examiner*—K. Negash
*Attorney, Agent, or Firm*—Brooks Haidt Haffner & Delahunty

[57] ABSTRACT

An optical fiber telecommunications system having two terminals interconnected by optical fibers and active-fiber optical amplifiers. Each terminal has an optical telecommunication signal transmitter associated with an optical signal receiver which are interconnected by a protective device which causes the transmitter to be inoperative when its associated receiver does not receive an optical signal. Optical switches are provided at the downstream sides of active-fiber optical amplifiers and are controlled by detecting devices coupled to amplifier outputs, each of which detecting devices opens the associated switch in the absence of a signal having the characteristics, e.g. an alternating component, of the optical telecommunication signal whereby the protective devices are operated.

21 Claims, 1 Drawing Sheet

OPTICAL-FIBRE TELECOMMUNICATIONS LINE WITH PROTECTION DEVICE FOR OPTICAL AMPLIFIERS

DESCRIPTION

The present invention relates to an optical-fibre telecommunications line with protection device for optical amplifiers.

This application is related to application Ser. No. 07/844,115 filed Mar. 2, 1992 and filed by the inventors named in this application.

Telecommunications lines are known which use optical fibres to connect two terminal stations, each provided with a transmitter and a receiver suitable for allowing two directional communication.

In particular each station comprises a transmitter, which sends a light signal along an optical-fibre line destined for the opposite station, and a receiver suitable for detecting the optical signal arriving from the other station and to send it on to a user.

In the case wherein the terminal stations are at a great distance from one another several amplification units may be interposed along the line (say, a power amplifier in the proximity of the line input, one or more line amplifiers and a pre-amplifier immediately before the receiver at the line's extremity), which raise the power of the signal, so as to compensate for the attenuation to which the signal itself is subjected along the path.

Such amplification units may be constituted by so-called repeaters, which convert the signal from optical to electric, amplify it in the electrical form and reconvert it to a highpower optical signal and reintroduce it again into the line, or they may be optical amplifiers, which receive the signal in the optical form and produce its amplification while maintaining its optical form.

An example of such optical amplifiers is constituted by the active-fibre optical amplifiers, wherein a fibre containing a fluorescent substance receives the optical signal to be amplified and pumping light energy at a different wavelength, which determines a stimulated emission on the part of the fluorescent substance coherent with the optical signal to be transmitted, which is thus amplified.

Amplifiers of the abovementioned type are, for example, described in the European patent application No. 90202736.6 dated Oct. 15, 1990 and published May 2, 1991 and corresponding to U.S. Pat. No. 5,119,229.

A problem inherent in optical-fibre telecommunications lines relates to the protection of staff who repair or maintain the line.

In the case of an intervention on a line fibre, say, in the presence of a breakage thereof, it is necessary to avoid the presence of light emission in the fibre, because such emission could accidentally be directed toward the eyes of the maintenance staff, with consequent offence for their eyes.

In this respect the known art, as described, for example, in the ISPT standard [Upper Institute of Posts and Telecommunications], technical specifications No. 919, January 1989 edition, pages 135-144, lays down that in the case of the non-reception of the signal on the part of an exchange unit or of a line unit in one direction of transmission the transmitter operating in the opposite direction must be shut down. This in turn, determines the shutting down of the transmitter in the station upstream, eliminating the presence of light emissions in the interrupted line.

A unit operating in the manner described above is illustrated in the publication "SIEMENS TELECOMUNICAZIONI, Doc. 612-802/56-TM/I, edition 1, October 1989".

It has been discovered by the Applicant that an optical-fibre transmitter line with active-fibre optical amplifiers can be put in safety conditions and automatically restored by providing one or more amplifiers with respective protection means in a position of shutting down the amplifier itself in case the optical fibre upstream from the amplifier is interrupted.

More accurately, the above protection means comprise means for the detection of the presence of light energy at the input to the amplifier and associated means for causing the shutting down of the amplifier, which in the absence of light energy at the input to the amplifier are operated by said means for detection to interrupt substantially any emission of light energy on the part of said optical amplifier.

In this way, every time an interruption of the optical fibre takes place upstream from the optical amplifier, the consequent absence of light energy at the input to the same determines through the abovementioned detection means and associated control means the shutting down of the amplifier, which thus ceases to operate and above all to emit light energy at output.

Such interruption of the light energy at output is transmitted directly or through similar devices present in further amplifiers up to the terminal station, where devices of the traditional type are present to disactivate the transmitter operating on the return line, and then back the starting station, where a similar protection device of the traditional type disactivates the starting transmitter putting the entire line under safe conditions.

The line's functionality is on the other hand automatically restored after the interruption has been repaired, by switching on again a transmitter of one of the terminal stations, since each optical amplifier provided with such a protection device is again arranged to be in operational conditions as soon as the light energy at its input returns above the threshold level of said detection means.

The Applicant has also observed that the abovementioned protection is suitable in a number of types of line and power amplifiers, but that in some cases there are additional problems.

In particular, amplifiers exist applied in some positions along the line, such as, say, the so-called <pre-amplifiers> for the application immediately upstream from a terminal line station, for which the power of the optical signal at inlet is particularly low.

In such cases the need has been identified of reducing to a minimum the attenuation of the signal upstream from the amplifier due to the introduction of safety devices, while at the same time avoiding the possibility that phenomena of spontaneous emissions of the active fibre may prevent the recognition of the absence of the signal at input, consequent on an operating anomaly.

According to the invention an optical-fibre telecommunications line has thus been accomplished, comprising two terminal stations, each having an optical-signal transmitter and receiver operationally connected by an automatic protection device suitable for shutting down said transmitter in the absence of a received optical signal, and respective optical-fibre lines connecting the transmitter of one station to the receiver of the other station and including at least one optical amplifier, characterized in that at least one of said optical amplifiers has a protection device comprising means for the detection of the presence of an optical signal at the output from the amplifier, operationally associated with means for interrupting the emission of light located downstream of the said detection means, the interruption of the emission downstream determining the interruption of the emission along the entire line through the intervention of said automatic device for the protection of the terminal stations.

According to a preferred embodiment, said protection device associated with at least one optical amplifier also comprises filtering means to limit the optical signal at the output from the amplifier to just the alternating component of the same.

In this way the device for the protection of the amplifier operates, as has already been said, on just the alternating component of the signal at output from the amplifier itself. This allows the discrimination to be made between the presence of a transmitted optical signal and the presence of a continuous signal due to the spontaneous emission of the amplifier in the absence of the optical signal at input and thus to avoid non-interventions of the station's protection device.

It should lastly be considered that, by operating on the signal at output from the amplifier, an undesired attenuation of the optical signal upstream from the amplifier is avoided.

These and other features of the present invention shall be made evident by the following detailed description of an embodiment illustrated purely as a non-limiting example in the enclosed drawings, wherein.

Figure 1:
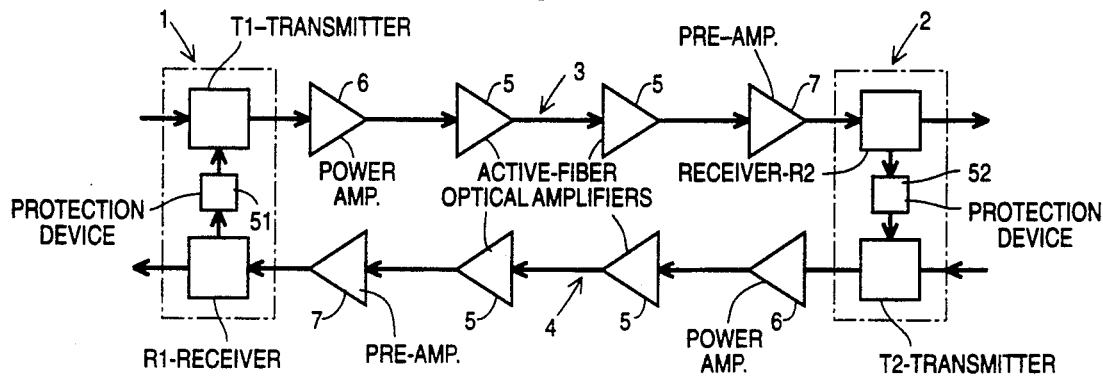
FIG. 1 shows the overall diagram of an optical-fibre telecommunications line.

With reference to FIG. 1, in general an optical-fiber transmitter line comprises two terminal stations 1 and 2, each of which comprises a transmitter and a receiver, T1, R1 and T2, R2, respectively.

The transmitter T1 of the station 1 is connected to the receiver R2 of the station 2 through a first optical-fiber line 3 which can operate in one direction (from 1 toward 2) and the transmitter T2 of the station 2 is connected to the receiver R1 of the station 1 through a second optical-fiber line 4 destined to operate in the opposite direction (from 2 toward 1).

Along each line 3 and 4 there are several amplifiers, preferably constituted by active-fibre optical amplifiers.

Between them it is possible, on the basis of the needs of the line, to have a power amplifier 6, located in the proximity of the input terminal, and several line amplifiers 5.

In addition to them it is convenient to adopt preamplifiers 7 located in the proximity of the output terminal, suitable for raising the power of the optical signal up to a level adequate to the sensitivity of the receiver used, say, between $-5$ dBm and $-15$ dBm.

The terminal stations 1 and 2 are provided with automatic protection devices 51, 52 of the traditional type, which in the absence of a signal at the input to the receiver on a line cause the shutting down of the transmitter operating on the opposite line.

Figure 2:
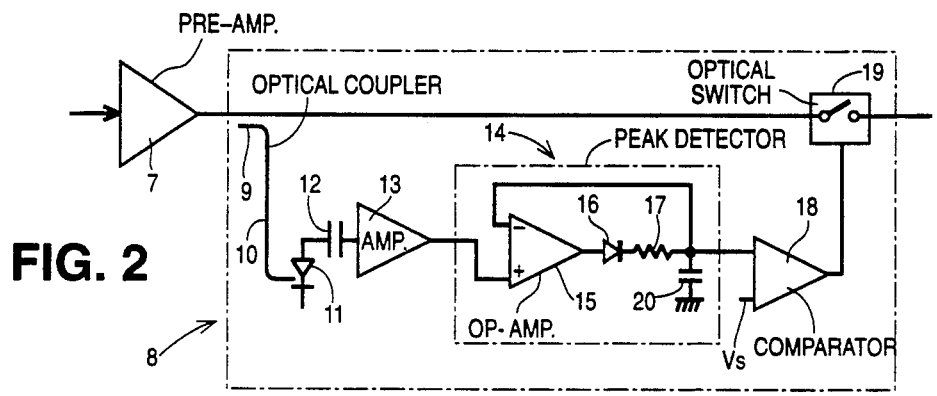
FIG. 2 shows the association of a protection device according to the invention with an active-fibre optical preamplifier included in the abovementioned line.

According to the present invention, as illustrated in FIG. 2, with one or more of the abovementioned amplifiers, in particular with the pre-amplifier 7, there is associated a protection device 8 which comprises a coupler 9, say, of the fused-fibre type with a shunted optical waveguide 10, located at the output from the pre-amplifier, an optical photodiode detector 11, a condenser 12 for the removal of the continuous component of the detected signal, an amplifier 13, a peak detector 14, a comparator 18 with reference threshold Vs and an optical switch 19 which the comparator 18 causes to open each time the peak detector 14 detects that an optical signal at output from the pre-amplifier has an alternating component with a peak value lower than the threshold Vs.

The peak detector is, for example, constituted by an backfed operational amplifier 15, whose output is connected to the comparator 18 through a diode 16, and a resistance 17 and is connected to ground by a condenser 20.

As an example, the optical input signal of the preamplifier can have a level ranging from $-35$ dBm to $-45$ dBm and the pre-amplifier can, for example, provide a gain of 30 dBm, thus raising the optical signal to a level ranging from $-5$ dBm to $-15$ dBm.

The spontaneous emission of the pre-amplifier has indicatively a continuous level of the order of $-10$ dBm, thus comparable with the average power of the amplified signal.

Using a commercially available coupler 9 of the 1/10 type this takes 1/10 of the amplified optical signal and introduces a loss along the path to the line's optical output of some 0.5 dBm, negligible in practice as far as the transmission is concerned, providing the photodiode 11 with a signal with a level ranging from $-15$ dBm and $-25$ dBm, plus a spontaneous emission with a level equal to $-20$ dBm.

The optical signal taken by the coupler 9 is converted by the photodiode 11 into a corresponding electrical signal, from which the condenser 12 withdraws the continuous component and that is subsequently amplified by the amplifier 13.

The withdrawal of the continuous component allows the protection device to distinguish between the transmitted optical signal, which contains a substantial alternating component, and a spontaneous emission, having a continuous component of a high level, while its alternating component has an appreciably lower level.

Figure 3:
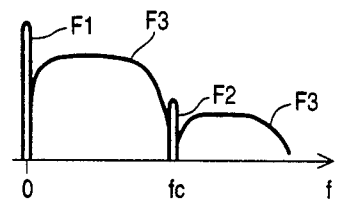
FIG. 3 shows the frequency spectrum of a possible transmitted optical signal.

As can be observed from the diagram of FIG. 3, a typical frequency spectrum at the output from an optical pre-amplifier in the presence of a transmitted optical signal which consists of a continuous component F1 (f=0), linked to the amplifier's spontaneous emission, that is, to noise, in a component with a numbered F2 frequency (f=fc) and in a substantially continuous spectrum F3, containing the transmitted information.

Figure 4:
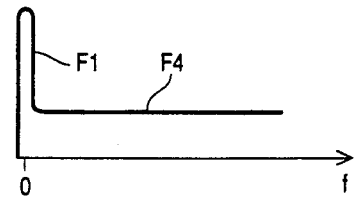
FIG. 4 shows the frequency spectrum of the pre-amplifier's spontaneous emission.

There is shown in FIG. 4 the frequency spectrum at the output from the pre-amplifier in the absence of a signal; such spectrum comprises a continuous component F1, linked to the amplifier's spontaneous emission, having a high intensity, substantially equal to that of the transmitted optical signal, and an almost flat (blank)

<noise> spectrum F4, having a level appreciably lower than that of the signal.

Thus the elimination of the continuous component of the amplifier's emission allows the making of a comparison between the level of the F2 or F3 emission, in the presence of a signal, and the level of the F4 emission, that is, of noise in the absence of a signal, which has a value substantially lower than the previous ones, for example, at least lower than one tenth of the F2 or F3 levels, (with the typical power values indicated above) and can thus be distinguished easily from it.

The amplifier 13 amplifies only a limited band of the signal's spectrum. For example, it has been found convenient, with optical signals transmitted at 565 Mb/s, to use a frequency band from 20 kHz to 200 kHz.

The signal, filtered by the condenser 12, is amplified by the amplifier 13, for example up to levels around 1 volt, and then applied across the input of the peak detector 14, whose output is a continuous signal level, which varies, for example, from about 200 mV in the presence of the spontaneous emission only to at least 600 mV in the presence of a transmitted optical signal, even if of a low level (−45 dB).

This difference in level determines the triggering, in one direction or the other, of the comparator 18, whose intervention threshold can indicatively be placed around 400 mV.

When it recognizes the absence of a signal, the comparator 18 opens the optical switch 19, for example, constituted by a "Switch Module 11" produced by JDS Optics.

There is thus accomplished in this manner the function of interrupting the optical signal at the output from the preamplifier in the absence of an input signal, ensuring optical safety through the interruption of the optical emission downstream on the part of the pre-amplifier.

The receiver of the downstream terminal station, say, R2 in the case of an interruption of communications on line 3, upstream from the pre-amplifier, in the absence of an input signal interrupts in a traditional manner the transmission of the transmitter T2 associated with it, operating in the opposite direction, thus causing the information regarding the detected anomaly to reach the station 1 through the line 4.

The station 1 then, again in a traditional manner, interrupts the transmission of the related transmitter T1, thus placing in a safe condition (absence of optical emission) the line 3 along which the anomaly has occurred.

In the presence of other line 5 or power 6 amplifiers, the safety of the line as a whole requires that, in the absence of an input signal, these do not emit at output, i.e., downstream, spontaneous emissions or noise, at a dangerous level.

The optical safety in the pre-amplifier is attained, with the equipment described, without introducing an optical loss upstream from the pre-amplifier, as would be the case if the coupler 9 were to be inserted into the line upstream from the pre-amplifier itself.

The insertion of a coupler upstream from the preamplifier, in fact, even if it were to introduce a very limited loss, say, 1/10 or 1/20 of the optical power reaching the preamplifier, would reduce the signal to a very low level, such that the signal/noise ratio at the output from the preamplifier would be unacceptable.

It has, on the other hand, been discovered that, even in the presence of very low-level signals, typical at the input to a pre-amplifier, it is possible to detect the presence or the absence of a signal in the line, and thus the possible anomaly or interruption, and to bring the line to conditions of safety, by interrupting the emission of the pre-amplifier in the downstream direction.

When the line is about to be re-activated, when transmission in a terminal station is restored, on the other hand, the optical preamplifier, that has remained active, even with an interrupted emission, receives and amplifies the received optical signal and the protection device thus detects its presence; on the basis of this the optical switch 19 is immediately closed again, and transmission toward the receiver is restored without requiring local action.

Figure 5:
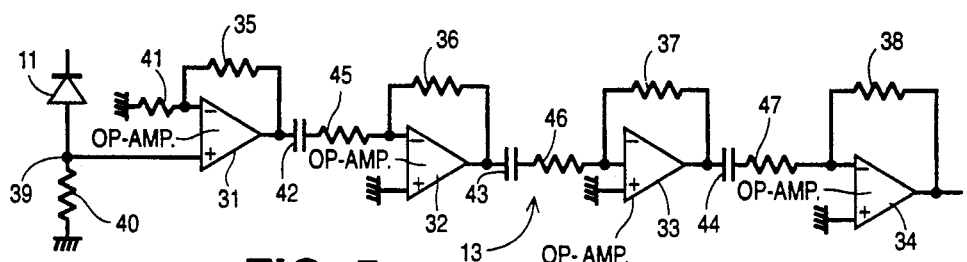
FIG. 5 shows a preferred embodiment of an electronic amplifier with filtering condensers which may be used within the scope of the protection device according to the invention.

There is shown in FIG. 5 a preferred embodiment of the amplifier 13 with related filtering means equivalent to the condenser 12 of FIG. 2.

The abovementioned amplifier is, for example, constituted by a cascade of operational amplifier stages 31-34 provided with respective feed-back resistances 35-38 which connect the respective outputs to the respective inverting inputs. The operational amplifier 31 has the non-inverting input connected to an intermediate node 39 between the photodiode 11 and a resistance 40 interposed between the same photodiode and ground, while the other operational amplifiers 32-34 have the non-inverting input connected directly to ground. The inverting input of the operational amplifier 31 is connected to ground through a resistance 41, while the non-inverting inputs of the operational amplifiers 32-34 are connected to the outputs of the operational amplifiers 31-33, respectively, through respective series of a capacity 42-44 and of a resistance 45-47. The capacities 42-44 constitute the filtering means otherwise indicated with 12 in FIG. 2.

Let us suppose, as an example, that the feed-back resistances 35-38 are of 100 kohms, that the resistances 40, 41 and 45-47 are of 10 kohms, that the capacities 42-44 are of 100 nF and lastly that all the operational amplifiers have the same gain, set at 10.

The product of gain times bandwidth of the amplifier of FIG. 5 is thus of some 3 MHz and the upper band limit is thus of some 300 kHz for each stage and slightly less for four stages in cascade.

The cut-off frequency is given by the formula $$fl = \frac{1}{2\pi RC}$$

where R = 10 kohm and C = 100 nF, so that fl is roughly equal to 160 Hz for each stage and slightly more for the three stages in cascade.

That shown in the drawings is obviously only one of the numerous possible embodiments of the present invention.

It must also be understood that the invention, though it is described with reference to optical amplifiers of the active-fibre type, in union with which it finds a preferred application embodiment, can be applied to any type of optical amplifier with similar requirements and characteristics.

We claim:

1. In an optical fiber telecommunications system comprising;
 a first terminal station comprising a first optical signal transmitter for transmitting optical telecommunication signals, a first optical signal receiver for receiving optical telecommunication signals and first protection means connected to said receiver and said transmitter for preventing transmission of optical signals by said transmitter in the absence of the receipt of optical telecommunication signals by said receiver, a second terminal station comprising a second optical signal transmitter for transmitting optical telecommunication signals, a second optical signal receiver for receiving optical telecommunication signals and second protective means connected to said second receiver and said second transmitter for preventing transmission of optical signals by said second transmitter in the absence of the receipt of optical telecommunication signals by said second receiver;

first optical signal transmitting means interconnecting said first transmitter with said second receiver for transmitting optical signals in a direction downstream from said first transmitter to said second receiver, said first optical signal transmitting means comprising optical fibers;

second optical signal transmitting means interconnecting said second transmitter with said first receiver for transmitting optical signals in a direction downstream of said second transmitter to said first receiver, said second optical signal transmitter means comprising optical fibers; and at least one of said first and second optical signal transmitting means comprising at least one active fiber optical amplifier having an input and an output and which upon receiving optical telecommunication signals from the transmitter to which said one of said first and said second optical signal transmitting means is connected transmits, at its output, corresponding amplified optical signal downstream of said amplifier;

the improvement comprising:

detection and interrupting means coupled to said output of said amplifier and responsive to optical telecommunication signals transmitted at said output and for interrupting the transmission of optical signals to a receiver by said amplifier in the absence of optical telecommunication signals at the output of said amplifier; whereby at least one of said protection means prevents transmission of optical signals by at least one of said first and second transmitters.

2. An optical fiber telecommunications system as set forth in claim 1 wherein said detection and interrupting means comprises discrimination means for discriminating between optical telecommunications signals and other optical signals at the output of the said amplifiers and openable and closable switch means intermediate said amplifier and a receiver for permitting transmission of optical signals from said amplifier to the last-mentioned said receiver when said switch means is closed and for interrupting the transmission of optical signals from said amplifier to the last-mentioned said receiver, said discrimination means opening said switch means in the absence of said optical telecommunications signals.

3. An optical fiber telecommunications system as set forth in claim 2 wherein said detection and interrupting means is coupled to said output of said amplifier by an optical coupler.

4. An optical fiber telecommunications system as set forth in claim 3 wherein said optical coupler is a fused fiber optical coupler.

5. An optical fiber telecommunications system as set forth in claim 3 wherein said optical coupler provides to said detection and interrupting means between one tenth and one twentieth of the optical signals at said output of said amplifier.

6. An optical fiber telecommunications system as set forth in claim 2 wherein said discrimination means comprises:

conversion means for converting optical signals at said output of said amplifier into electrical signals;

filtering means connected to said conversion means for separating optical signals having an alternating component from said other optical signals; and comparison means connected to said filtering means and to said switch means for operating said switch means in accordance with the presence and absence of said alternating component.

7. Active fiber optical amplifier apparatus for telecommunication lines, said apparatus comprising:

an active-fiber amplifier having an input for receiving optical telecommunication signals and an output for delivering amplified optical signals corresponding to the optical telecommunications signals received at said input to an optical fiber;

interrupting means at said output of said amplifier for interrupting the provision of optical signals by said amplifier to said optical fiber; and detection means coupled to said output of said amplifier intermediate said output and said interrupting means for operating said interrupting means in the absence of said optical telecommunications signals and for preventing delivery of optical signals to said optical fiber.

8. Active fiber optical amplifier apparatus as set forth in claim 7 wherein said detection means comprises filtering means for separating optical signals having an alternating component from other signals and means connected to said filtering means for operating said interrupting means in the absence of optical signals with an alternating component.

9. Active fiber optical amplifier apparatus as set forth in claim 7 wherein said detection means is coupled to said output of said amplifier by an optical coupler intermediate said output and said interrupting means.

10. Active fiber optical amplifier apparatus as set forth in claim 7 wherein said detection means comprises:

conversion means for converting optical signals at said output of said amplifier into electrical signals;

filtering means connected to said conversion means for rejecting electrical signals having a substantially constant amplitude with respect to other electrical signals; and comparison means connected to said filtering means and said interrupting means for operating said interrupting means in accordance with the amplitude of said other electrical signals.

11. Active fiber optical amplifier apparatus as set forth in claim 10 wherein said filtering means comprises means for blocking said substantially constant amplitude electrical signals and passing other electrical signals.

12. Active fiber optical amplifier apparatus as set forth in claim 10 further comprising an optical coupler coupling said conversion means to said output of said amplifier and wherein said conversion means comprises a photodiode coupled to said optical coupler for receiving optical signals from said optical coupler.

13. Active fiber optical amplifier apparatus as set forth in claim 10 wherein said other electrical signals have an alternating component and a peak and wherein said comparison means comprises peak detection means for detecting the peak of said alternating component and for operating said interrupting means when said peak does not exceed a predetermined value.

14. Active fiber optical amplifier apparatus as set forth in claim 10 further comprising an electrical signal amplifier connected intermediate said photodiode and said comparison means.

15. Active fiber optical amplifier apparatus as set forth in claim 14 wherein said electrical signal amplifier is intermediate said filtering means and said comparison means.

16. Active fiber optical amplifier apparatus as set forth in claim 15 wherein said amplifier comprises a plurality of stages coupled serially by alternating current coupling means.

17. Active fiber optical amplifier apparatus as set forth in claim 10 wherein said filtering means has a pass band from about 20 KHz to 200 KHz.

18. Active fiber optical amplifier apparatus as set forth in claim 10 wherein said active fiber optical amplifier is a pre-amplifier and is immediately upstream of an optical signal receiver.

19. Protection device for an optical fiber telecommunicaton line which comprises an optical telecommunication signal transmitter connected to an optical signal receiver by an optical fiber and an active fiber optical amplifier having an input for receiving optical signals from said transmitter and an output for providing amplified optical signals to said receiver, said protection device comprising:

detection means for receiving optical signals at the output of said amplifier;

filtering means connected to said detection means for passing optical signals having an alternating component with a peak and rejecting other optical signals;

comparison means connected to said filtering means for comparing said peak of said alternating component with a predetermined value;

interrupting means connected to said comparison means and for connection between said amplifier and said optical fiber for preventing optical signals from being provided to said optical fiber when said peak does not exceed said predetermined value.

20. Protection device as set forth in claim 19 wherein said detection means comprises an optical coupler for coupling said detection means to said output and a photodiode coupled to said coupler for converting optical signals to electrical signals.

21. Protection device as set forth in claim 20 wherein said filtering means comprises alternating current coupling means and an electrical amplifier.

* * * * *